United States Patent
Lin et al.

(10) Patent No.: US 7,256,231 B2
(45) Date of Patent: Aug. 14, 2007

(54) SILICA-REINFORCED RUBBER COMPOUNDED WITH BLOCKED MERCAPTOSILANES AND ALKYL ALKOXYSILANES

(75) Inventors: Chenchy Jeffrey Lin, Hudson, OH (US); William L. Hergenrother, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 264 days.

(21) Appl. No.: 10/987,847

(22) Filed: Nov. 12, 2004

(65) Prior Publication Data

US 2006/0106143 A1 May 18, 2006

(51) Int. Cl.
*C08G 18/62* (2006.01)
(52) U.S. Cl. ..................... 524/237; 524/262
(58) Field of Classification Search ............... 524/237, 524/262
See application file for complete search history.

(56) References Cited

U.S. PATENT DOCUMENTS

| | | | | |
|---|---|---|---|---|
| 3,768,537 A | 10/1973 | Hess et al. | ............ | 152/330 |
| 3,814,160 A | 6/1974 | Creasey | ............ | 152/330 |
| 4,519,430 A | 5/1985 | Ahmad et al. | ............ | 152/209 R |
| 6,127,468 A | 10/2000 | Cruse et al. | ............ | 524/225 |
| 6,136,913 A | 10/2000 | Nahmias et al. | ............ | 524/492 |
| 6,204,339 B1 | 3/2001 | Waldman et al. | ............ | 525/350 |
| 6,433,065 B1 | 8/2002 | Lin et al. | ............ | 524/492 |
| 6,512,035 B1 * | 1/2003 | Hergenrother et al. | ............ | 524/262 |
| 6,528,673 B2 | 3/2003 | Cruse et al. | ............ | 556/427 |
| 6,548,594 B2 | 4/2003 | Luginsland et al. | ............ | 524/571 |
| 6,579,949 B1 | 6/2003 | Hergenrother et al. | ............ | 525/342 |
| 6,610,218 B1 | 8/2003 | Duvall et al. | ............ | 252/402 |
| 6,635,700 B2 | 10/2003 | Cruse et al. | ............ | 524/262 |
| 6,649,684 B1 | 11/2003 | Okel | ............ | 524/493 |
| 6,683,135 B2 | 1/2004 | Cruse et al. | ............ | 525/100 |
| 2003/0199619 A1 | 10/2003 | Cruse | ............ | 524/261 |

OTHER PUBLICATIONS

Joshi, P.G. et al. The Next Generation of Silane Coupling Agents for Silica/Silane-Reinforced Tire Tread Compounds. (Second Edition). Crompton OSi Specialties. Publication Date unknown.

* cited by examiner

*Primary Examiner*—Peter D. Mulcahy
(74) *Attorney, Agent, or Firm*—Meredith E. Hooker; Jenny L. Sheaffer

(57) ABSTRACT

The invention provides a sulfur vulcanizable silica-reinforced elastomeric compound having improved tensile mechanical and dynamic viscoelastic properties. The compounds are formed by mixing an elastomer optionally having an alkoxysilane terminal group, with silica in the presence of an alkyl alkoxysilane and a blocked mercaptosilane. In particular, the mercaptosilane moiety of the blocked mercaptosilane and the alkyl alkoxysilane are present in a weight ratio of about 0.001:1 to about 0.20:1. Preferably, the blocked mercaptosilane and the alkyl alkoxysilane are compounded with the elastomer and the silica at high temperature to facilitate the silica-silane reaction. A deblocking agent is added at any desired mixing stage, optionally with the cure package, to allow binding of the mercaptosilane to the polymer.

24 Claims, No Drawings

SILICA-REINFORCED RUBBER COMPOUNDED WITH BLOCKED MERCAPTOSILANES AND ALKYL ALKOXYSILANES

BACKGROUND OF THE INVENTION

The invention generally relates to vulcanizable elastomeric compounds containing silica as a reinforcing filler. When producing elastomeric compositions for use in rubber articles, such as tires, power belts, and the like, it is desirable that these elastomeric compositions are easily processable during compounding and have a high molecular weight with a controlled molecular weight distribution, glass transition temperature ($T_g$) and vinyl content. It is also desirable that reinforcing fillers, such as silica and/or carbon black, be well dispersed throughout the rubber in order to improve various physical properties, such as the compound Mooney viscosity, modulus, tangent delta (tan δ), and the like. Rubber articles, especially tires, produced from vulcanized elastomers exhibiting these improved properties will have reduced hysteresis, better rolling resistance, snow and ice traction, wet traction, and improved fuel economy for vehicles equipped with such tires.

When silica is used as a reinforcing filler for rubber, filler dispersion in rubber stocks is a major concern. Because polar silanol groups on the surface of silica particles tend to self-associate, reagglomeration of silica particles can occur after compounding, leading to poor silica dispersion and a high compound viscosity. The strong silica filler network results in a rigid uncured compound that is difficult to process in extrusion and forming operations.

Previous attempts at preparing readily processable, vulcanizable silica-filled rubber stocks containing natural rubber or diene polymer and copolymer elastomers have focused on the use, during compounding, of bifunctional silica coupling agents having a moiety (e.g., a silyl group) reactive with the silica surface, and a moiety (e.g., a mercapto, amino, vinyl, epoxy or sulfur group) that binds to the elastomer. Well known examples of such silica coupling agents are mercaptosilanes and bis-(trialkoxysilylorgano) polysulfides, such as bis-(3-triethoxysilylpropyl) tetrasulfide (TESPT) which is sold commercially as Si69 (Degussa). However, silica-filled rubber stocks employing bis-alkoxy polysulfide silanes require more than one mixing step at limited temperatures prior to the addition of cure agents, with cooling periods between the steps, leading to an overall increase in the cost of making the final product.

The γ-mercaptoalkyltrialkoxysilanes have been reported to offer excellent coupling between rubber and silica, resulting in rubbers having improved wet ice skid resistance, rolling resistance and tread wear, as well as improved adhesion between rubber and cords. However, the high chemical reactivity of the mercapto (—SH) function of the mercaptosilanes with organic polymers can lead to unacceptably high viscosities during processing and to premature curing (scorch), making compounding and processing more difficult. Mixing and milling must be done more quickly, yet at lower temperatures (e.g., 120° C. to 145° C.), so that the compound will not begin to vulcanize before it is shaped or molded. The low processing temperature results in a marked reduction in the mechanical activity of mixing needed for an optimum dispersion of the silica throughout the polymer matrix. Therefore, compared with carbon black-filled compositions, tread compounds having good silica dispersion require a longer mixing time at a lower temperature to achieve improved performance, resulting in decreased production and increased expense. Like bis-(trialkoxysilylorgano) polysulfide silica coupling agents, mercaptosilanes are relatively costly and they often have a noticeable odor.

The high scorch sensitivity and odor of the mercaptosilanes can be improved by the introduction of so-called protective groups for the mercapto (—SH) function to form "blocked mercaptosilanes." However, the introduction of such protective groups reduces not only the scorch sensitivity but also the coupling yield, which must be compensated for by a higher dosage of the silane. This is undesirable because of the high prices of such blocked mercaptosilanes.

SUMMARY OF THE INVENTION

Unexpectedly, it has been discovered that improvements in the tensile mechanical properties and dynamic viscoelastic properties of silica-reinforced sulfur vulcanized rubbers can be achieved by compounding rubber with silica at a high temperature of about 160° C. to about 185° C., with fewer mixing steps than required with TESPT, in the presence of an alkyl alkoxysilane silica dispersing aid and a very small amount of a blocked mercaptosilane silica coupling agent. From a practical standpoint, the combined use of a very small amount of the blocked mercaptosilane with a much larger relative amount of alkyl alkoxysilane, to achieve improved rubber properties in fewer mixing steps, results in a significant cost savings to the rubber industry.

The blocked mercaptosilane comprises a blocking moiety that blocks the mercapto part of the molecule (i.e. the mercapto hydrogen atom is replaced by another group, hereafter referred to as "blocking group") while not affecting the silica-reactive mercaptosilane moiety. For purposes of this disclosure, the silica-reactive "mercaptosilane moiety" is defined as the molecular weight equivalent to the molecular weight of γ-mercaptopropyl triethoxysilane. A deblocking agent can be added later in the manufacturing process, after the silica-silane reaction has occurred, to allow the sulfur atom of the mercaptosilane to bond rapidly with the rubber. The deblocking agent can be added at any time during the compounding process as a single component during any mixing stage in which deblocking is desired. Often deblocking is desired during the curing stage of compounding and the addition of the deblocking agent is added in the final mixing stage. The deblocking agent can be contained in a sulfur cure package and, often, can function as a cure accelerator, especially in combination with a zinc salt.

In embodiments according to the invention, the weight ratio of the mercaptosilane moiety of the blocked mercaptosilane to the alkyl alkoxysilane can be, for example, about 0.001:1 to about 0.20:1. In further examples, the weight ratio of the mercaptosilane moiety to the alkyl alkoxysilane can be about 0.01:1 to about 0.20:1; 0.001:1 to about 0.14:1; or about 0.01:1 to about 0.14:1. The blocked mercaptosilane can be present in the rubber compound in an amount of about 0.0001% to about 3% by weight, and such as about 0.001% to about 1.5% by weight, and further such as about 0.01% to about 1% by weight, based on the weight of the silica.

The invention also provides a method for making the sulfur vulcanized compound of the invention, and a pneumatic tire having at least one component that comprises the vulcanized compound.

DETAILED DESCRIPTION OF THE INVENTION

The terms elastomer, polymer and rubber are used interchangeably herein, as is customary in the rubber industry. The invention provides a sulfur-vulcanizable elastomeric compound, comprising an elastomer; a reinforcing filler comprising silica or a mixture thereof with carbon black; an alkyl alkoxysilane; a blocked mercaptosilane silica coupling agent comprising a mercaptosilane moiety and a blocking moiety, wherein the weight ratio of the mercaptosilane moiety to the alkyl alkoxysilane can be, for example, about 0.001:1 to about 0.20:1; a deblocking agent; and a cure package. Further, the weight ratio of the mercaptosilane moiety to the alkyl alkoxysilane can be about 0.01:1 to about 0.20:1; 0.001:1 to about 0.14:1; or about 0.01:1 to about 0.14:1, depending on the selected compounding conditions and desired physical characteristics of the rubber produced. Another way of expressing the amount of blocked mercaptosilane employed with respect to the alkyl alkoxysilane is the mole ratio of the coupling agent to the alkyl alkoxysilane that varies from about 0.0012:1 to about 0.24:1 and, further, can be about 0.012:1 to about 0.24:1 and, further can be about 0.0012:1 to about 0.168:1 and, further can be about 0.012:1 to about 0.168:1, respectively.

The deblocking agent can comprise a sulfur cure accelerator and can be a part of the cure package. Alternatively, the deblocking agent can comprise, for example, an acid or a base that is selected independently of the cure package and can be added to the mixing process at any stage in which deblocking is desired.

The amount of the blocked mercaptosilane and the alkyl alkoxysilane in the compound is based on the weight of silica in the compound. The alkyl alkoxysilane can be present, for example, in an amount of about 0.1% to about 20% by weight, about 1% to about 15% by weight, or about 1% to about 10% by weight. Correspondingly, the mercaptosilane can be present in the compound in the amount of about 0.0001% to about 3% by weight, about 0.001% to about 1.5% by weight, or about 0.01% to about 1% by weight.

Blocked mercaptosilanes suitable for use in the invention compounds are not limited to any particular formula. However, in general, the blocked mercaptosilane will have an available silyl group for reaction with silica in a silica-silane reaction, and a blocking group (B) that replaces the mercapto hydrogen atom to block the reaction of the sulfur atom with the polymer, as illustrated in the exemplary formula

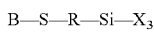

B—S—R—Si—X$_3$

As an example, R can be $C_1$ to $C_6$ linear or branched alkylidene, and each X can be independently selected from the group consisting of $C_1$ to $C_4$ alkyl or $C_1$ to $C_4$ alkoxy, such as ethoxy, methoxy, and the like. Blocking groups B can be in the form of an unsaturated heteroatom or carbon bound directly to sulfur via a single bond.

Examples of specific B groups can include, but are not limited to, thiocarboxylate ester, dithiocarbamate ester, thiosulfonate ester, thiosulfate ester, thiophosphate ester, thiophosphonate ester, thiophosphinate ester, and the like. However, these examples are not intended to be limiting, as other suitable chemical structures known to those skilled in the art are intended to fall within the scope of blocked mercaptosilanes that can be used in the rubber compounds according to the invention.

Suitable blocked mercaptosilanes can include, but are not limited to, those described in U.S. Pat. Nos. 6,127,468; 6,204,339; 6,528,673; 6,635,700; 6,649,684; 6,683,135; the disclosures of which are hereby incorporated by reference with respect to the examples described. Representative examples of the silanes for use herein include, but are not limited to, 2-triethoxysilyl-1-ethylthioacetate; 2-trimethoxysilyl-1-ethylthioacetate; 2-(methyldimethoxy-silyl)-1-ethylthioacetate; 3-trimethoxysilyl-1-propylthioacetate; triethoxysilylmethyl-thioacetate; trimethoxysilylmethylthioacetate; triisopropoxysilylmethylthioacetate; methyldiethoxysilylmethylthioacetate; methyldimethoxysilylmethylthioacetate; methyldiiso-propoxysilylmethylthioacetate; dimethylethoxysilylmethylthioacetate; dimethylmethox-ysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl)-1-ethylthioacetate; 2-(dimethylmethoxysilyl)-1-ethylthioacetate; 2-(dimethylisopropoxysilyl)-1-ethylthioacetate; 3-triethoxysilyl-1-propyl-thioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl) benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethyl-thioacetate; tris-(3-triethoxysilyl-1-propyl)trithiophosphate; bis-(3-triethoxysilyl-1-propyl) methyldithiophosphonate; bis-(3-triethoxysilyl-1-propyl) ethyldithiophosphonate; 3-triethoxysilyl-1-propyldimethylthiophosphinate; 3-triethoxysilyl-1-propyldiethylthio-phosphinate; tris-(3-triethoxysilyl-1-propyl)tetrathiophosphate; bis-(3-triethoxysilyl-1propyl) methyltrithiophosphonate; bis-(3-triethoxysilyl-1-propyl) ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyl-dimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethyl-thiosulfate; 3-triethoxysilyl-1-propylmethanethiosulfonate; 3-triethoxysilyl-1-propyl-ethanethiosulfonate; 3-triethoxysilyl-1-propylbenzenethiosulfonate; 3-triethoxysilyl-1-propyltoluenethiosulfonate; 3-triethoxysilyl-1- propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercaptosilanes can be used.

A further example of a suitable blocked mercaptosilane for use in the invention is NXT™ silane (3-Octanoylthio-1-propyltriethoxysilane), commercially available from GE Silicones.

When reaction of the mixture to couple the filler to the polymer is desired, a deblocking agent is added to the mixture to deblock the blocked mercaptosilane compound. In many cases the deblocking agent will simply be environmental moisture present either from the atmosphere or present on the substrate. The deblocking agent can be a nucleophile containing a hydrogen atom sufficiently labile such that hydrogen atom could be transferred to the site of the original blocking group to form the mercaptosilane. Thus, with a blocking group acceptor molecule, an exchange of hydrogen from the nucleophile would occur with the blocking group of the blocked mercaptosilane to form the mercaptosilane and the corresponding derivative of the nucleophile containing the original blocking group. Regardless of the blocking group initially present on the blocked mercaptosilane and regardless of the deblocking agent used, the initially substantially inactive (from the standpoint of coupling to the organic polymer) blocked mercaptosilane is substantially converted at the desired point in the rubber compounding procedure to the active mercaptosilane. It is noted that partial amounts of the nucleophile can be used (i.e., stoichiometric deficiency), or even weak nucleophile, if one were to only deblock part of the blocked mercaptosilane to control the degree of vulcanization of a specific formulation.

The deblocking agent can be added in the final mix or, alternatively, at any other stage in the compounding process as a single component. The deblocking agent can be added in quantities such as about 0.01 to about 5 phr, and further such as about 0.5 to about 3 phr. Classes of compounds that would act as deblocking agents, but not normally be effective as cure accelerators, allowing for selection between the two, are oxides, hydroxides, carbonates, bicarbonates, alkoxides, phenoxides, sulfanamide salts, acetyl acetonates, carbon anions derived from high acidity C—N bonds, malonic acid esters, cyclopentadienes, phenols, sulfonamides, nitrites, fluorenes, tetraalkyl ammonium salts, and tetraalkyl phosphonium salts. Examples of nucleophiles suitable as deblocking agents can include any primary or secondary amines, or amines containing C=N double bonds, such as imines or guanidines, with the proviso that the amine contains at least one N—H bond. Numerous specific examples of guanidines, amines and imines are well known in the art. Some examples include N,N'-diphenylguanidine, N,N',N''-triphenylguanidine, N,N'-diortho-tolylguanidine, ortho-biguanide, hexamethylenetetramine, cyclohexylethylamine, dibutylamine, and 4,4'-diaminodiphenylmethane. Any general acid catalysts used to transesterify esters, such as Bronsted or Lewis acids, could be used as catalysts.

Other examples of deblocking agents, especially when used in combination with a zinc compound, are commonly used sulfur cure accelerators such as thiuram, sulfenamide, or thiazole compounds. Suitable accelerators include, but are not limited to, TMTD (tetramethylthiuram disulfide), CBS (N-cyclohexyl-2-benzothiazole sulfenamide), MBT (mercaptobenzothiazole), TBBS (N-tert-butyl-benzothiazole sulfenamide), MBTS (2,2'-Dithiobis-(benzothiazole)), TETD (Tetraethylthiuram disulfide), TMTM (Tetramethylthiuram monosulfide), and the like, and mixtures thereof. Advantageously, such cure accelerators can be used in a deblocking/cure package added in the final stage of the compounding process.

Alkyl alkoxysilanes suitable for use in the invention compound have the formula

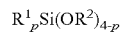

$$R^1_p Si(OR^2)_{4-p}$$

where the alkoxy groups are the same or different from each other, each $R^1$ independently comprises $C_1$ to about $C_{20}$ aliphatic, about $C_5$ to about $C_{20}$ cycloaliphatic, or about $C_6$ to about $C_{20}$ aromatic, each $R^2$ independently comprises $C_1$ to about $C_6$ aliphatic, and p is an integer from 1 to 3. As a further example, each $R^1$ independently comprises $C_6$ to about $C_{15}$ aliphatic and, as a further example, comprises $C_8$ to $C_{14}$ aliphatic.

Exemplary alkyl alkoxysilanes include, but are not limited to, octyltriethoxysilane, octyltrimethoxysilane, trimethylethoxysilane, cyclohexyltriethoxysilane, isobutyltriethoxy-silane, ethyltrimethoxysilane, cyclohexyltributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltri-methoxysilane, propyltrimethoxysilane, hexyltrimethoxysilane, heptyltrimethoxysilane, nonyltrimethoxysilane, decyltrimethoxysilane, dodecyltrimethoxysilane, tetradecyltri-methoxysilane, octadecyl-trimethoxysilane, methyloctyl dimethoxysilane, and mixtures of these.

In further exemplary embodiments, the alkyl alkoxysilane is selected from hexyltriethoxysilane, heptyltriethoxysilane, octyltriethoxysilane, nonyltriethoxysilane, decyltriethoxysilane, dodecyltriethoxysilane, tetradecyltriethoxysilane, octadecyltriethoxy-silane, hexyltrimethoxysilane, heptyltrimethoxysilane, octyltrimethoxysilane, nonyltrimethoxysilane, decyltrimethoxysilane, dodecyltrimethoxysilane, tetradecyltri-methoxysilane, octadecyltrimethoxysilane, and mixtures of these.

Although alkyl alkoxysilanes and blocked mercaptosilanes employing methoxysilane groups can be used, it is preferred for environmental reasons that ethoxysilanes are employed, rather than methoxysilanes, because ethyl alcohol, rather than methyl alcohol, will be released when the alkoxysilane portion of the coupling agent reacts with the surface of the silica particle.

As discussed below, the elastomer is preferably selected from the group consisting of homopolymers of conjugated diene monomers, and copolymers and terpolymers of the conjugated diene monomers with monovinyl aromatic monomers and trienes. Exemplary elastomers include, but are not limited to, polyisoprene, polystyrene, polybutadiene, butadiene-isoprene copolymer, butadiene-isoprene-styrene terpolymer, isoprene-styrene copolymer, and styrene-butadiene copolymer.

The sulfur-vulcanized elastomeric compound of the invention is prepared by the steps of (a) mixing together at a temperature of about 160° C. to about 185° C., in the absence of added sulfur, cure agents and deblocking agents, (i) an elastomer, (ii) a reinforcing filler comprising silica or a mixture thereof with carbon black, (iii) an alkyl alkoxysilane, (iv) a blocked mercaptosilane silica coupling agent comprising a mercaptosilane moiety (as defined above, having a molecular weight equivalent to the molecular weight of γ-mercaptopropyl triethoxysilane) and a blocking moiety, wherein the weight ratio of the mercaptosilane moiety to the alkyl alkoxysilane is about 0.001:1 to about 0.20:1; (b) allowing the mixture to cool below the mixing temperature; (c) mixing the mixture obtained in step (b), at a temperature lower than a vulcanization temperature, with a deblocking agent and a cure package, wherein the deblocking agent is added in a separate substep or is added with the cure package; and (d) curing the mixture obtained in step (c).

The compound is often cured at about 140° C. to about 190° C. for about 5 to about 120 minutes.

In particular, the initial step of the method, the silane-silica reaction step, proceeds optimally when the mixture reaches a temperature from about 160° C. to about 185° C., about 165° C. to about 185° C., or about 170° C. to about 180° C. and the like. However, the silane-silica reaction step will also proceed, albeit more slowly, at a temperature less than 160° C., or about 130° C. to 160° C. In one embodiment of the invention, the initial mixing step can include at least two substeps. That is, the initial mixing step can comprise a first substep (i) mixing together the elastomer, at least a portion of the silica, at least a portion of alkyl alkoxysilane and at least a portion of the blocked mercaptosilane, with an optional intervening cooling step; and a second substep (ii) mixing the mixture obtained in step (i) with the remainder of the silica, if any, and the remainder of the alkyl alkoxysilane and/or blocked mercaptosilane, if any.

Although it may not be necessary, the method can further include a remill step in which either no ingredients are added to the first mixture, or non-curing ingredients are added, in order to reduce the compound viscosity and improve the dispersion of the silica reinforcing filler. The temperature of the remill step is often about 130° C. to about 175° C., and often about 145° C. to about 165° C.

The final step of the mixing process is the addition of cure agents to the mixture, including an effective amount of sulfur to achieve a satisfactory cure of the final compound. The temperature at which the final mixture is mixed must be below the vulcanization temperature in order to avoid unwanted precure of the compound. Therefore, the temperature of the final mixing step should not exceed about 120° C. As an example, the temperature can be about 40° C. to about 120° C., about 60° C. to about 110° C. or about 75° C. to about 100° C., and the like.

The order of addition of the silica, alkyl alkoxysilane and the blocked mercaptosilane to the mixer in the initial step of the method is not critical. The alkyl alkoxysilane and/or the blocked mercaptosilane can be added prior to or after the addition of the silica. In one embodiment, portions of the silica and the blocked mercaptosilane and/or the alkyl alkoxysilane are added simultaneously to the mixer. For example, the blocked mercaptosilane and/or the alkyl alkoxysilane can be partially or fully supported on the silica and/or the carbon black reinforcing filler. If the silane is a liquid, a suitable ratio of supported silane to filler is that which results in a suitably dry material for addition to the elastomer. For example, the ratio can be about 1/99 to about 70/30, about 20/80, about 60/40, about 50/50, and the like.

It has been found that the use of an alkyl alkoxysilane with a very small amount of blocked mercaptosilane requires an appropriate adjustment in the amount of sulfur added to the elastomeric compound to achieve a satisfactory cure of the compound. In particular, the amount of the blocked mercaptosilane employed in the present invention provides substantially less sulfur than required for a satisfactory cure. An effective amount of sulfur in an invention composition would provide a property of the cured compound that is approximately equal to the same property of a satisfactorily cured compound containing a conventional amount of Si69 with a conventional amount of sulfur. Exemplary cured compound properties for comparison include, but are not limited to, the value of the 300% modulus (MPa), the molecular weight between crosslinks ($M_c$, kg/mol), and the like, and other cured compound properties that are well known to those skilled in the art of rubber making. The increased amount of sulfur to compensate for the reduced availability of sulfur from the blocked mercaptosilane silica coupling agent will vary from composition to composition, depending on the amount of silica and the amount of blocked mercaptosilane silica coupling agent present in the formulation. Based on the disclosure contained herein, and in the examples of invention compositions described below, one skilled in the art of rubber compounding can easily determine the effective amount of sulfur required for a satisfactory cure of the compound without undue experimentation. The additional sulfur can take any form, including soluble sulfur, insoluble sulfur, or any of the sulfur-donating compounds described as vulcanizing agents below, or mixtures of the foregoing.

The compounds produced by the foregoing method exhibit significant improvement in processability, scorch, and cure times over comparison stocks containing a non-blocked mercaptosilane and alkyl alkoxysilane. The compounds also demonstrate improvements in dynamic viscoelastic properties, especially an improved tan δ at 50° C., indicating an improvement in rolling resistance, while maintaining a comparable tan δ at 0° C.

The vulcanizable elastomeric composition is preferably compounded with reinforcing fillers, such as silica, or a mixture of silica and carbon black. Examples of silica reinforcing filler which can be used in the vulcanized elastomeric compounds of the invention include precipitated amorphous silica, wet silica (hydrated silicic acid), dry silica (anhydrous silicic acid), fumed silica, calcium silicate, and the like. Other suitable fillers include aluminum silicate, magnesium silicate, and the like. Among these, precipitated amorphous wet-process, hydrated silicas are preferred. These silicas are so-called because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. For silicas of interest for the present invention, the surface area should be about 3.2 $cm^2$/kg to about 40 $cm^2$/kg, with the range of about 10 $cm^2$/kg to about 25 $cm^2$/kg being preferred, and the range of about 15 $cm^2$/kg to about 22 $cm^2$/kg being most preferred. The pH of the silica filler is generally about 5.5 to about 7 or slightly over, preferably about 5.5 to about 6.8.

Silica can be employed in the amount of about one to about 100 parts by weight per hundred parts of the elastomer (phr), preferably in an amount of about five to about 80 phr and, more preferably, in an amount of about 30 to about 80 phr. The useful upper range is limited by the high viscosity imparted by fillers of this type. Some of the commercially available silicas which can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from Degussa Corporation (e.g., VN2, VN3), Rhone Poulenc (e.g., Zeosil® 1165MP), and J.M. Huber Corporation.

The elastomers can be compounded with all forms of carbon black in a mixture with the silica. The carbon black can be present in amounts ranging from about one to about 50 phr, with about five to about 35 phr being preferred. The carbon blacks can include any of the commonly available, commercially-produced carbon blacks, but those having a surface area (EMSA) of at least 2 cm$^2$/kg and, more preferably, at least 3.5 cm$^2$/kg up to 20 cm$^2$/kg or higher are preferred. Surface area values used in this application are determined by ASTM D-1765 using the cetyltrimethylammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks can be used in preparing the carbon black products of the invention. Typical suitable carbon blacks are N-110, N-220, N-339, N-330, N-351, N-550, N-660, as designated by ASTM D-1765-82a. The carbon blacks utilized in the preparation of the vulcanizable elastomeric compositions of the invention can be in pelletized form or an unpelletized flocculent mass. Preferably, for more uniform mixing, unpelletized carbon black is preferred.

Certain additional fillers can be utilized according to the present invention as processing aids, including mineral fillers, such as clay (hydrous aluminum silicate), talc (hydrous magnesium silicate), aluminum hydrate [Al(OH)$_3$] and mica, as well as non-mineral fillers such as urea and sodium sulfate. Preferred micas principally contain alumina and silica, although other known variants are also useful. The foregoing additional fillers are optional and can be utilized in the amount of about 0.5 to about 40 phr, preferably in an amount of about one to about 20 phr and, more preferably in an amount of about one to about 10 phr.

The present invention can be used in conjunction with any solution polymerizable or emulsion polymerizable elastomer. Solution and emulsion polymerization techniques are well known to those of ordinary skill in the art. For example, conjugated diene monomers, monovinyl aromatic monomers, triene monomers, and the like, can be anionically polymerized to form conjugated diene polymers, or copolymers or terpolymers of conjugated diene monomers and monovinyl aromatic monomers (e.g., styrene, alpha methyl styrene and the like) and triene monomers. Thus, the elastomeric products can include diene homopolymers from monomer A and copolymers thereof with monovinyl aromatic monomers B. Exemplary diene homopolymers are those prepared from diolefin monomers having from about four to about 12 carbon atoms. Exemplary vinyl aromatic copolymers are those prepared from monomers having from about eight to about 20 carbon atoms. Copolymers can comprise from about 99 percent to about 50 percent by weight of diene units and from about one to about 50 percent by weight of monovinyl aromatic or triene units, totaling 100 percent. The polymers, copolymers and terpolymers of the present invention can have 1,2-microstructure contents ranging from about 10 percent to about 80 percent, with the preferred polymers, copolymers or terpolymers having 1,2-microstructure content of from about 25 to 65 percent, based upon the diene content. The elastomeric copolymers are preferably random copolymers which result from simultaneous copolymerization of the monomers A and B with randomizing agents, as is known in the art.

Particularly suitable polymers for use in a vulcanized elastomeric compound of the invention include polyisoprene, polystyrene, polybutadiene, butadiene-isoprene copolymer, butadiene-isoprene-styrene terpolymer, isoprene-styrene copolymer, and styrene-butadiene copolymer.

The conjugated diene polymers, or copolymers or terpolymers of conjugated diene monomers and monovinyl aromatic monomers, can be utilized as 100 parts of the rubber in the treadstock compound, or they can be blended with any conventionally employed treadstock rubber which includes natural rubber, synthetic rubber and blends thereof. Such rubbers are well known to those skilled in the art and include synthetic polyisoprene rubber, styrene-butadiene rubber (SBR), styrene-isoprene-butadiene rubber, styrene-isoprene rubber, butadiene-isoprene rubber, polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene-propylene rubber and the like. When the vulcanizable elastomeric composition of the present invention is blended with conventional rubbers, the amounts can vary widely with a lower limit comprising about ten percent to 20 percent by weight of the total rubber. The minimum amount will depend primarily upon the physical properties desired.

Vulcanized elastomeric compounds of the invention are prepared by the method described above. It is readily understood by those having skill in the art that the rubber compound would be compounded by methods generally known in the rubber compounding art, such as mixing the various vulcanizable polymer(s) with various commonly used additive materials such as, for example, curing agents, activators, retarders and accelerators, processing additives, such as oils, resins, including tackifying resins, plasticizers, pigments, additional fillers, fatty acid, zinc oxide, waxes, antioxidants, anti-ozonants, and peptizing agents. As known to those skilled in the art, depending on the intended use of the sulfur vulcanizable and sulfur vulcanized material (rubbers), the additives mentioned above are selected and commonly used in conventional amounts, in addition to other conventional rubber additives including, for example, other fillers, plasticizers, antioxidants, cure agents and the like, using standard rubber mixing equipment and procedures.

Such elastomeric compositions, when vulcanized using conventional rubber vulcanization conditions, exhibit reduced hysteresis, which means a product having increased rebound, decreased rolling resistance and lessened heat build-up when subjected to mechanical stress. Products including tires, power belts and the like are envisioned. Decreased rolling resistance is, of course, a useful property for pneumatic tires, both radial as well as bias ply types and thus, the vulcanizable elastomeric compositions of the present invention can be utilized to form treadstocks for such tires. Pneumatic tires can be made according to the constructions disclosed in U.S. Pat. Nos. 5,866,171; 5,876,527; 5,931,211; and 5,971,046, the disclosures of which are incorporated herein by reference. The composition can also be used to form other elastomeric tire components such as subtreads, black sidewalls, body ply skims, bead fillers and the like.

Typical amounts of tackifier resins, if used, comprise about 0.5 to about 10 phr, usually about one to about 5 phr. Typical amounts of compounding aids comprise about one to about 50 phr. Such compounding aids can include, for example, aromatic, naphthenic, and/or paraffinic processing oils. Typical amounts of antioxidants comprise about 0.1 to about 5 phr. Suitable antioxidants, such as diphenyl-p-phenylenediamine, are known to those skilled in the art. Typical amounts of anti-ozonants comprise about 0.1 to about 5 phr.

Typical amounts of fatty acids, if used, which can include stearic acid, palmitic acid, linoleic acid or a mixture of one or more fatty acids, can comprise about 0.5 to about 3 phr. Typical amounts of zinc oxide comprise about one to about 5 phr. Typical amounts of waxes comprise about one to about 2 phr. Often microcrystalline waxes are used. Typical amounts of peptizers, if used, comprise about 0.1 to about 1 phr. Typical peptizers can be, for example, pentachlorothiophenol and dibenzamidodiphenyl disulfide.

The reinforced rubber compounds can be cured in a conventional manner with known vulcanizing agents at about 0.1 to 10 phr. For a general disclosure of suitable vulcanizing agents, one can refer to Kirk-Othmer, *Encyclopedia of Chemical Technology*, 3rd ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination.

The vulcanization is conducted in the presence of a sulfur vulcanizing agent. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Preferably, the sulfur vulcanizing agent is soluble sulfur or a mixture of soluble and insoluble polymeric sulfur. The sulfur vulcanizing agents are used in an amount ranging from about 0.1 to about 10 phr, more preferably about 1.5 to about 7.5 phr, with a range of about 1.5 to about 5 phr being most preferred.

Accelerators are used to control the time and/or temperature required for vulcanization and to improve properties of the vulcanizate. The vulcanization accelerators used in the present invention are not particularly limited. Examples include thiazol vulcanization accelerators, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and the like; and guanidine vulcanization accelerators, such as diphenylguanidine (DPG) and the like. The amount of the vulcanization accelerator used is about 0.1 to about 5 phr, preferably about 0.2 to about 3 phr.

Pneumatic tires having an improved tensile mechanical and dynamic viscoelastic properties, and comprising at least one component produced from the sulfur-vulcanized elastomeric compound of the invention, according to the method of the invention described above, exhibit improved rolling resistance over those prepared with a non-blocked mercaptosilane and alkyl alkoxysilane, as indicated by an improved tan δ at 50° C.

EXAMPLES

The following examples illustrate methods of preparation of the vulcanizable elastomeric composition of the present invention. However, the examples are not intended to be limiting, as other methods for preparing these compositions and different compounding formulations may be determined by those skilled in the art without departing from the scope of the invention herein disclosed and claimed.

Example 1

In order to demonstrate the methods of preparation and properties of vulcanized elastomeric compounds according to embodiments of the invention, five stocks of rubbers were compounded using the compounding formulations and mixing conditions shown in Table 1. All stocks contained solution styrene-butadiene rubber, silica and carbon black. Invention stocks 1, 2 and 3 further contained a blocked mercaptosilane (B-MS) silica coupling agent and an alkylalkoxysilane (n-octyltriethoxysilane, OTES) silica hydrophobating agent. The B-MS was 3-Octanoylthio-1-propyl-triethoxysilane (NXT™ silane, GE Silicones), having a molecular weight of 364 g/mol. For comparison, control stock C-2 contained a combination of OTES and a non-blocked mercaptosilane (MS), 3-mercaptopropyltriethoxysilane, having a molecular weight of 238.42 g/mol. Because of the presence of the blocking agent, a greater amount of the B-MS (0.3, 0.53 and 0.75 phr) was used to obtain equivalence to the MS used in C-2. The weight ratios of the "mercaptosilane moiety" of the B-MS to the OTES were 0.067:1, 0.116:1 and 0.163:1, respectively. The mole ratios of the B-MS to the OTES for these examples are 0.076:1, 0.134:1 and 0.190:1, respectively. The weight ratio of the MS:OTES ratio in C-2 was 0.067:1. The OTES and B-MS or MS were added in the first master batch stage at an achieved temperature of 157° C. A combination of zinc oxide, DPG accelerator and CBS accelerator, that also acted as a deblocking package was added with sulfur in the final batch.

The MS can be used in liquid form or can be carried on the silica. For example, a commercial MS on silica is Ciptane® 255 LD (containing 0.5% SH) from PPG Industries, which is MS carried on silica. When Ciptane® is employed, the amount of silica added to the compound is adjusted to maintain the desired total amount of silica.

As a further comparison, control stock C-1 was similarly compounded, but with a different type of sulfur-containing silica coupling agent, bis(3-triethoxysilylpropyl) tetrasulfide (S4 silane, Si69) that was added in the second master batch stage to an achieved temperature of 146° C., in order to avoid the premature curing that is known to occur with this coupling agent at a temperature of 160° C. or greater. The amount of Si69 was 10% by weight, based on the weight of the silica.

The total sulfur content of invention stocks 1, 2 and 3, and comparison stock C-2 was increased to compensate for the sulfur donated by the Si69 in C-1.

Each of the invention and comparison stocks was remilled without the addition of further ingredients. Such a remill is typically performed to lower the Mooney viscosity of the compound when a polysulfane silica coupling agent (e.g., Si69) is employed. The invention stocks and C-2 were remilled for purposes of comparison with C-1.

All of the compounded final stocks prepared as described above were sheeted and subsequently annealed at 171° C. for 15 minutes. The annealing conditions employed are similar to conventional curing conditions.

Example 2

The green stock (i.e., the stock obtained after the final stage, prior to curing) was characterized as to Mooney viscosity ($ML_{1+4}$) and cure characteristics. The Mooney viscosity measurement was conducted at 130° C. using a large rotor, and was recorded as the torque when rotor had rotated for 4 minutes. The stocks were preheated at 130° C. for 1 minute before the rotor was started. The $t_5$ is the time required for the viscosity to increase to 5% of the maximum torque. It is used as an index to predict how fast the compound viscosity will increase during processing (e.g., during extrusion). A Monsanto Rheometer MD2000 was used to characterize the stock curing process, at a frequency of 1.67 Hz and a strain of 7% at 160° C. The measurements $t_{S2}$, $t_{50}$ and $t_{90}$ are the times taken for an increase in torque of 2%, 50% and 90%, respectively, of the total torque increase during the cure characterization test. These values are useful in predicting the speed of the viscosity increase ($t_{S2}$) and the cure rate during the cure process ($t_{50}$ and $t_{90}$).

TABLE 1

Formulation of Rubber Stocks

| Component (phr) | Control C-1 S4 Silane | Control C-2 MS:OTES (Ratio = 0.067:1) | Stock 1 B-MS/OTES (Ratio* = 0.067:1) | Stock 2 B-MS/OTES (Ratio* = 0.116:1) | Stock 3 B-MS/OTES (Ratio* = 0.163:1) |
|---|---|---|---|---|---|
| Master Batch 1 | | | | | |
| Solution SBR | 100 | 100 | 100 | 100 | 100 |
| Carbon Black | 35 | 35 | 35 | 35 | 35 |
| Silica | 30 | 30 | 30 | 30 | 30 |
| Oil | 15 | 12 | 12 | 12 | 12 |
| Wax | 1 | 1 | 1 | 1 | 1 |
| Stearic Acid | 1.5 | 1.5 | 1.5 | 1.5 | 1.5 |
| Antiozonant[1] | 0.95 | 0.95 | 0.95 | 0.95 | 0.95 |
| Blocked Mercaptosilane[2] | | | 0.3 | 0.53 | 0.75 |
| n-Octyltriethoxysilane[3] | | 3 | 3 | 3 | 3 |
| Mercaptosilane[4] | | 0.2 | | | |
| (Drop Temperature) | 157° C. | 157° C. | 157° C. | 157° C. | 157° C. |
| Master Batch 2 | | | | | |
| S4 Silane[5] | 3 | | | | |
| (Drop Temperature) | 146° C. | 153° C. | 153° C. | 153° C. | 153° C. |
| Remill | | | | | |
| (Drop Temperature) | 146° C. | 153° C. | 153° C. | 153° C. | 153° C. |
| Final Batch | | | | | |
| CBS[6] | 1.5 | 1.5 | 1.5 | 1.5 | 1.5 |
| DPG[7] | 0.5 | 0.5 | 0.5 | 0.5 | 0.5 |
| Retarder[8] | 0.25 | 0.25 | 0.25 | 0.25 | 0.25 |
| Zinc Oxide | 2.5 | 2.5 | 2.5 | 2.5 | 2.5 |
| Sulfur | 1.7 | 2.43 | 2.43 | 2.43 | 2.43 |
| (Drop Temperature) | 105° C. | 105° C. | 105° C. | 105° C. | 105° C. |

[1] Santoflex 13 (Flexsys);
[2] 3-Octanoylthio-1-propyltriethoxysilane (NXT™ silane, GE silicones);
[3] OTES;
[4] 3-mercaptopropyltriethoxysilane (Gelest);
[5] Si69 liquid (Degussa);
[6] N-Cyclohexylbenzothiazole-2-sulfenamide;
[7] diphenylguanidine;
[8] N-(Cyclohexylthio)pthalimide
*Weight ratio of the "thio-1-propyltriethoxysilane" (mercapto moiety) portion of the NXT silane to the OTES.

TABLE 2

Properties of Rubber Stocks

| Tested Property | Control C-1 S4 Silane | Control C-2 MS:OTES (Ratio = 0.067:1) | Stock 1 B-MS/OTES (Ratio* = 0.067:1) | Stock 2 B-MS/OTES (Ratio* = 0.116:1) | Stock 3 B-MS/OTES (Ratio* = 0.163:1) |
|---|---|---|---|---|---|
| $ML_{1+4}$ @ 130° C. | 46.13 | 54.16 | 45.07 | 44.7 | 44.48 |
| $T_5$ | 1846 | 1813 | 1851 | 1849 | 1828 |
| MD2000 160° C. | | | | | |
| $T_{50}$ | 4.78 | 4.04 | 4.53 | 4.41 | 4.48 |
| $T_{90}$ | 24.68 | 17.72 | 20.57 | 19.82 | 19.9 |
| MH-ML | 20.22 | 18.85 | 20.62 | 21 | 21.47 |
| $ts_2$ | 2.37 | 2.61 | 2.88 | 2.83 | 2.94 |
| Ring Tear 100° C. | | | | | |
| Strength (kN/m) | 20.6 | 19.87 | 18.63 | 19.05 | 20.13 |

TABLE 2-continued

Properties of Rubber Stocks

| Tested Property | Control C-1 S4 Silane | Control C-2 MS:OTES (Ratio = 0.067:1) | Stock 1 B-MS/OTES (Ratio* = 0.067:1) | Stock 2 B-MS/OTES (Ratio* = 0.116:1) | Stock 3 B-MS/OTES (Ratio* = 0.163:1) |
|---|---|---|---|---|---|
| Eb | 239.00 | 222.00 | 224.00 | 217.00 | 215.00 |
| Ring Tensile 25° C. | | | | | |
| M50 (MPa) | 1.34 | 1.31 | 1.36 | 1.41 | 1.46 |
| M300 (MPa) | 14.46 | 13.62 | 14.1 | 15.14 | 15.06 |
| Tb (MPa) | 18.61 | 17.54 | 16.14 | 18.64 | 17.37 |
| Eb (%) | 363 | 312 | 332 | 321 | 319 |
| Toughness (MPa) | 28.28 | 22 | 22.2 | 22.14 | 23.19 |
| Temperature Sweep | | | | | |
| G' −20 MPa | 42.83 | 35.08 | 41.72 | 41.12 | 41.23 |
| tan δ 0° C. | 0.3365 | 0.3357 | 0.3408 | 0.3371 | 0.3314 |
| G' 25° C. MPa | 7.09 | 4.95 | 6.29 | 6.23 | 6.38 |
| G' 50° C. MPa | 5.62 | 4.1 | 4.96 | 4.93 | 5.03 |
| tan δ 50° C. | 0.2039 | 0.1411 | 0.1747 | 0.1711 | 0.1691 |
| MTS Compression | | | | | |
| tan δ 0° C. | 0.2712 | 0.272 | 0.2796 | 0.2747 | 0.2751 |
| tan δ 50° C. | 0.1747 | 0.1231 | 0.147 | 0.1372 | 0.1398 |
| Strain Sweep 50° C. | | | | | |
| G' @ 0.25% | 4.98 | 3.47 | 4.42 | 4.58 | 4.69 |
| G' @ 15% | 2.19 | 2.02 | 2.18 | 2.25 | 2.39 |
| ΔG' (MPa) | 2.79 | 1.45 | 2.24 | 2.33 | 2.3 |
| tan δ 0.5% | 0.1279 | 0.0969 | 0.12 | 0.1068 | 0.1057 |
| tan δ 2% | 0.1883 | 0.1258 | 0.1515 | 0.1438 | 0.1389 |
| tan δ 5% | 0.1933 | 0.1291 | 0.1448 | 0.1443 | 0.1389 |
| tan δ 10% | 0.1771 | 0.1185 | 0.1281 | 0.1303 | 0.1255 |

As illustrated in Table 2, the compound Mooney viscosity of each of the B-MS- and OTES-containing invention stocks 1, 2 and 3 was significantly lower than the viscosity of the comparison stock C-2 containing the non-blocked MS and OTES. This improvement in viscosity/processability is due to the prevention of premature polymer crosslinking at the compounding temperature (scorch) by the blocking of the sulfur groups on the mercaptosilane, in combination with the improved dispersion of the silica filler resulting from the reaction of the silica with the silane groups of both the B-MS and the OTES. The viscosity/processability of the B-MS/OTES stocks was also slightly improved over, or at least equivalent to, that obtained using a standard quantity of the silica coupling agent Si69. A lower compound Mooney viscosity is advantageous because it provides better processability and handling, especially during the extrusion process.

The $t_5$ scorch times and the $t_{S2}$ of B-MS- and OTES-containing invention stocks 1, 2 and 3 are longer than the comparison stock C-2 containing a non-blocked MS and OTES, giving the invention stocks the advantage of a larger processing time window, especially during extrusion, and a longer time to flow and fill the mold.

The tensile mechanical properties for the five stocks were measured using the standard procedure described in ASTM-D 412 at 25° C. The tensile test specimens were round rings 1.1 mm thick with an outside diameter of 17.4 mm and a thickness of 2.13 mm. A gauge length of 25.4 mm was used for the tensile test. As illustrated by the results of the tensile tests in Table 2, each of the invention stocks 1, 2 and 3 showed similar tensile strength, toughness and elongation at break to the comparison stocks C-1 and C-2. Further, each of the invention stocks 1, 2 and 3 showed improved tensile modulus at 300% strain (M300) over the comparison stock C-2 containing the non-blocked MS and OTES.

The dynamic viscoelastic properties of the cured invention and comparison stocks were obtained from strain and temperature sweep tests. In particular, the storage modulus (G') at −20° C. and the tan δ at 0° C. and 50° C. were obtained from ARES-A temperature sweep tests conducted at a frequency of 31.4 radians/second using 0.5% strain for temperatures ranging from −100° C. to −10° C. and 2% strain for the temperatures ranging from −10° C. to +100° C. The results showed that the tan δ's at 0° C. of invention stocks 1, 2 and 3 were equivalent to those of the comparison stocks C-1 and C-2. However, each of the invention stocks showed tan δs at 50° C. that were significantly lower than that of comparison stock C-1. The lower tan δ at 50° C. of invention stocks 1, 2 and 3 will result in decreased rolling resistance. Invention stocks 1, 2 and 3 also show a lower storage modulus (G' at −20° C.) than that of comparison stock C-1, indicating improved snow and ice traction.

A good silica coupling and dispersing agent should disperse the silica during compounding and stabilize the filler morphology during storage and curing of the compounds. The five stocks prepared in Example 1 were examined for filler flocculation (the Payne effect) before and after they were annealed at 171° C. for 15 minutes, as described above. This comparison illustrates the degree to which the filler flocculates prior to cure. The stocks do not contain curatives, therefore an increase in ΔG' cannot be attributed to sulfur crosslinking. The Payne effect was studied by means of ARES-HT strain sweeps of the five cured stocks at 50° C. at a frequency of 3.14 radians/second, and a strain sweeping from 0.25% to 15%. The data obtained from the strain sweep for the Payne effect and tan δ's at 0.5%, 2%, 5% and 10% strain are listed in Table 2.

In summary, each of the invention stocks containing a blocked mercaptosilane in combination with an alkyl alkoxysilane demonstrated significant improvement in processability, scorch, and cure times over the comparison stock containing a non-blocked mercaptosilane and the alkyl alkoxysilane. The results with the invention compounds were comparable to those achieved with the Si69 silica coupling agent.

Moreover, the invention stocks all showed improvements in dynamic viscoelastic properties compared with the standard comparison compound containing Si69. In particular, the invention stocks demonstrated an improved tan δ at 50° C., while maintaining comparable tan δ at 0° C., indicating an improvement in rolling resistance (tan δ at 50° C.).

While the invention has been described herein with reference to the preferred embodiments, it is to be understood that it is not intended to limit the invention to the specific forms disclosed. On the contrary, it is intended that the invention cover all modifications and alternative forms falling within the scope of the appended claims.

We claim:

1. A sulfur-vulcanizable elastomeric compound having an improved physical property, comprising:
   an elastomer;
   a reinforcing filler comprising silica or a mixture thereof with carbon black;
   an alkyl alkoxysilane;
   a blocked mercaptosilane silica coupling agent comprising a mercaptosilane moiety and a blocking moiety, wherein the weight ratio of the mercaptosilane moiety to the alkyl alkoxysilane is about 0.001:1 to about 0.20:1;
   a deblocking agent; and
   a cure package,
   wherein the elastomer, the silica, the alkyl alkoxysilane, and the blocked mercaptosilane are mixed together, in the absence of the deblocking agent and the cure package, at a temperature of about 160° C. to about 185° C.,
   and wherein the compound exhibits an improved physical property compared to a similar compound containing the alkyl alkoxysilane and a non-blocked mercaptosilane.

2. The compound of claim 1, wherein the weight ratio of the mercaptosilane moiety to the alkyl alkoxysilane is about 0.01:1 to about 0.20:1.

3. The compound of claim 1, wherein the weight ratio of the mercaptosilane moiety to the alkyl alkoxysilane is about 0.001:1 to about 0.14:1.

4. The compound of claim 1, wherein the weight ratio of the mercaptosilane moiety to the alkyl alkoxysilane is about 0.01:1 to about 0.14:1.

5. The compound of claim 1, wherein the deblocking agent comprises a sulfur cure accelerator.

6. The compound of claim 5, wherein the deblocking agent comprises the sulfur cure accelerator and a zinc salt.

7. The compound of claim 5, wherein the sulfur cure accelerator is selected from the group of accelerators consisting of thiurams, sulfenamides, thiazoles, amines, guanidines, imines, and mixtures thereof.

8. The compound of claim 1, wherein the blocked mercatosilane is present in an amount of about 0.0001% to about 3% by weight, based on the weight of the silica.

9. The compound of claim 8, wherein the blocked mercaptosilane is present in an amount of about 0.001% to about 1.5% by weight, based on the weight of the silica.

10. The compound of claim 8, wherein the blocked mercaptosilane is present in an amount of about 0.01% to about 1% by weight, based on the weight of the silica.

11. The compound of claim 1, wherein the alkyl alkoxysilane is present in an amount of about 0.1% to about 20% by weight, based on the silica.

12. The compound of claim 1, wherein the alkyl alkoxysilane compound has the formula $$R^1_p Si(OR^2)_{4-p}$$

wherein the alkoxy groups are the same or different from each other, each $R^1$ independently comprises $C_1$ to about $C_{20}$ aliphatic, about $C_5$ to about $C_{20}$ cycloaliphatic, or about $C_6$ to about $C_{20}$ aromatic, each $R^2$ independently comprises $C_1$ to about $C_6$ aliphatic, and p is an integer from 1 to 3.

13. The compound of claim 12, wherein each $R^1$ independently comprises $C_6$ to $C_{10}$ aliphatic.

14. The compound of claim 12, wherein each $R^1$ independently comprises $C_6$ to $C_9$ aliphatic.

15. The compound of claim 1, wherein the alkyl alkoxysilane is selected from the group consisting of octyltriethoxysilane, octyltrimethoxysilane, trimethylethoxysilane, cyclohexyltriethoxysilane, isobutyltriethoxysilane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxy-silane, dodecyltriethoxysilane, tetradecyltriethoxysilane, octadecyltri-ethoxysilane, methyloctyl-diethoxysilane, dimethyldimethoxysilane, methyltrimethoxysilane, propyltrimethoxy-silane, hexyltrimethoxysilane, heptyltrimethoxy-silane, nonyltrimethoxysilane, decyltrimethoxysilane, dodecyltrimethoxysilane, tetradecyltrimethoxysilane, octadecyltrimethoxysilane, methyloctyl dimethoxysilane, and mixtures thereof.

16. The compound of claim 15, wherein the alkyl alkoxysilane is selected from the group consisting of hexyltriethoxysilane, heptyltriethoxysilane, octyltriethoxysilane, nonyltriethoxysilane, decyltriethoxysilane, dodecyltriethoxysilane, tetradecyltri-ethoxysilane, octadecyltriethoxysilane, hexyltrimethoxysilane, heptyltrimethoxy-silane, octyltrimethoxysilane, nonyltrimethoxysilane, decyltrimethoxysilane, dodecyltrimethoxysilane, tetradecyltrimethoxysilane, octadecyltrimethoxysilane, and mixtures thereof.

17. The compound of claim 15, wherein the alkyl alkoxysilane comprises octyltriethoxysilane.

18. The compound of claim 1, wherein the elastomer is selected from the group consisting of homopolymers of conjugated diene monomers, and copolymers and terpolymers of the conjugated diene monomers with monovinyl aromatic monomers and trienes.

19. The compound of claim 1, wherein the temperature is about 165° C. to about 185° C.

20. The compound of claim 19, wherein the temperature is about 170° C. to about 185° C.

21. A pneumatic tire comprising a component produced from a sulfur-vulcanized elastomeric compound having an improved physical property, the compound comprising an elastomer; a reinforcing filler comprising silica or a mixture thereof with carbon black; an alkyl alkoxysilane; a blocked mercaptosilane silica coupling agent comprising a mercaptosilane moiety and a blocking moiety, wherein the weight ratio of the mercaptosilane moiety to the alkyl alkoxysilane is about 0.001:1 to about 0.20:1; a deblocking agent; and a cure package, wherein the elastomer, the silica, the alkyl alkoxysilane, and the blocked mercaptosilane are mixed together, in the absence of the deblocking agent and the cure package, at a temperature of about 160° C. to about 185° C., and wherein the compound exhibits an improved physical property compared to a similar compound containing the alkyl alkoxysilane and a non-blocked mercaptosilane.

22. A method for preparing a sulfur-vulcanized elastomeric compound, having an improved physical property, comprising the steps of:

(a) mixing together at a temperature of about 160° C. to about 185° C., in the absence of added sulfur, cure agents and deblocking agents, (i) an elastomer, (ii) a reinforcing filler comprising silica or a mixture thereof with carbon black, (iii) an alkyl alkoxysilane, (iv) a blocked mercaptosilane silica coupling agent comprising a mercaptosilane moiety and a blocking moiety, wherein the weight ratio of the mercaptosilane moiety to the alkyl alkoxysilane is about 001:1 to about 0.20:1;

(b) allowing the mixture to cool below the mixing temperature;

(c) mixing the mixture obtained in step (b), at a temperature lower than a vulcanization temperature, with a deblocking agent and a cure package, wherein the deblocking agent is added in a separate substep or is added with the cure package;

(d) curing the mixture obtained in step (c), wherein the compound exhibits an improved physical property compared to a similarly prepared compound containing the alkyl alkoxysilane and a non-blocked mercaptosilane.

23. The method of claim 22, wherein the mixing temperature in step (a) is about 165° C. to about 185° C.

24. The method of claim 22, wherein the mixing temperature in step (a) is about 170° C. to about 185° C.

* * * * *